United States Patent
Choi et al.

(10) Patent No.: US 11,409,648 B2
(45) Date of Patent: Aug. 9, 2022

(54) ELECTRONIC APPARATUS AND CONTROLLING METHOD FOR PERFORMING MEMORY SWAPPING TO REDUCE RESOURCE USAGE

(71) Applicants: SAMSUNG ELECTRONICS CO., LTD., Suwon-si (KR); RESEARCH & BUSINESS FOUNDATION SUNGKYUNKWAN UNIVERSITY, Suwon-si (KR)

(72) Inventors: Youngho Choi, Suwon-si (KR); Young Ik Eom, Suwon-si (KR); Jaeook Kwon, Suwon-si (KR)

(73) Assignees: SAMSUNG ELECTRONICS CO., LTD., Suwon-si (KR); RESEARCH & BUSINESS FOUNDATION SUNGKYUNKWAN UNIVERSITY, Suwon-si (KR)

(*) Notice: Subject to any disclaimer, the term of this patent is extended or adjusted under 35 U.S.C. 154(b) by 45 days.

(21) Appl. No.: 16/975,530

(22) PCT Filed: Dec. 20, 2018

(86) PCT No.: PCT/KR2018/016332
§ 371 (c)(1),
(2) Date: Aug. 25, 2020

(87) PCT Pub. No.: WO2019/194394
PCT Pub. Date: Oct. 10, 2019

(65) Prior Publication Data
US 2021/0034509 A1    Feb. 4, 2021

(30) Foreign Application Priority Data
Apr. 6, 2018    (KR) .................. 10-2018-0040593

(51) Int. Cl.
*G06F 12/02*    (2006.01)

(52) U.S. Cl.
CPC ...... *G06F 12/023* (2013.01); *G06F 2212/251* (2013.01)

(58) Field of Classification Search
None
See application file for complete search history.

(56) References Cited

U.S. PATENT DOCUMENTS

| | | |
|---|---|---|
| 6,879,266 B1 | 4/2005 | Dye et al. |
| 9,116,631 B2 | 8/2015 | Choi et al. |

(Continued)

FOREIGN PATENT DOCUMENTS

| | | |
|---|---|---|
| JP | H09-174962 | 7/1997 |
| JP | 2003-263366 | 9/2003 |

(Continued)

OTHER PUBLICATIONS

International Search Report for PCT/KR2018/016332 dated Apr. 11, 2019, 2 pages.

(Continued)

*Primary Examiner* — William E. Baughman
(74) *Attorney, Agent, or Firm* — Nixon & Vanderhye, PC.

(57) ABSTRACT

An electronic apparatus is provided. The electronic apparatus according to an embodiment includes a memory configured to store computer executable instructions, and a processor configured to, by executing the computer executable instructions, based on a request for executing a program being received and an available capacity of a first area of the memory to be allocated to the program being insufficient, swap-out page data stored in the first area to a second area of the memory, wherein the processor is further configured to swap out the page data partially or entirely based on an attribute of the page data.

15 Claims, 9 Drawing Sheets

(56) References Cited

U.S. PATENT DOCUMENTS

| | | | | |
|---|---|---|---|---|
| 2009/0327621 A1* | 12/2009 | Kliot | ................... | G06F 12/0253 |
| | | | | 711/154 |
| 2014/0372715 A1 | 12/2014 | Bak et al. | | |
| 2015/0242432 A1* | 8/2015 | Bak | ......................... | G06F 12/08 |
| | | | | 707/693 |
| 2015/0301843 A1* | 10/2015 | Guo | ................... | G06F 9/45558 |
| | | | | 718/1 |
| 2015/0301946 A1* | 10/2015 | Guo | ................... | G06F 9/45558 |
| | | | | 711/6 |
| 2019/0079799 A1* | 3/2019 | Kumar | .................. | G06F 9/5044 |
| 2019/0079876 A1* | 3/2019 | Kim | ..................... | G06F 12/121 |

FOREIGN PATENT DOCUMENTS

| | | |
|---|---|---|
| JP | 2007-156702 | 6/2007 |
| JP | 2008-140236 | 6/2008 |
| KR | 10-2013-0046459 | 5/2013 |
| KR | 10-2014-0075416 | 6/2014 |
| KR | 10-2014-0092493 | 7/2014 |
| KR | 10-2016-0124181 | 10/2016 |

OTHER PUBLICATIONS

Written Opinion of the ISA for PCT/KR2018/016332 dated Apr. 11, 2019, 9 pages.

Y. Choi et al., "Optimizing Memory Swapping Scheme on the Memory Debugging Platform of CE Devices", 2018 IEEE International Conference on Consumer Electronics (ICCE), 2018, 3 pages.

* cited by examiner

ELECTRONIC APPARATUS AND CONTROLLING METHOD FOR PERFORMING MEMORY SWAPPING TO REDUCE RESOURCE USAGE

This application is the U.S. national phase of International Application No. PCT/KR2018/016332 filed Dec. 20, 2018 which designated the U.S. and claims priority to KR Patent Application No. 10-2018-0040593 filed Apr. 6, 2018, the entire contents of each of which are hereby incorporated by reference.

FIELD

Devices and methods consistent with what is disclosed herein relate to an electronic apparatus and a controlling method thereof, and more particularly, to an electronic apparatus for performing memory swapping optimization to minimize resource usage and a controlling method thereof.

DESCRIPTION OF RELATED ART

The usage of HW resources of the SW platform has significantly increased due to the complicated features and functions of smart TVs and smart phones. The most frequently used HW resources are CPU, DRAM, flash memory, etc. For CPU, an operation speed increases and a replacement is available such as multi-cores. However, DRAM and flash memory have limitations that cannot infinitely increase a memory size and a storage capacity due to the characteristic of an embedded system, and show a relatively slow speed increase for use. In particular, since the DRAM has the fastest operation speed despite the volatile characteristic that data is erased when power is off, the DRAM is significantly used to increase an operation speed of an application.

Although the size of DRAM is increased by applying a large-capacity DRAM continuously, it is difficult to deal with the requirements for the explosively increasing memory usage only in terms of hardware. Moreover, increasing the size of DRAM in terms of hardware may not be the best solution since it causes a rise in product development cost.

To solve such memory shortage problem, there are various studies on software, especially many technologies are studied on operating systems. Memory recovery is a representative memory management technology supported by the operating system for ensuing a necessary memory. For example, Page Cache area used to increase speeds of a read operation and a write operation of a file is recovered by memory recovery and allocated to an application that requires a memory. Another example is memory swapping. Memory swapping secures a memory by copying data of a memory that is not frequently used to a storage space, recovering the memory, and transferring the memory to an application that requires a memory.

The conventional operating system provides various methods for securing a memory through memory recovery. However, such memory recovery is difficult to be applied to the DRAM and the embedded system which has a limit on the size of a storage device. For example, memory data that is less frequently used should be transferred to a storage device for memory swapping, but flash memory used in a smart TV has the different characteristic from and shorter life than HDD, and thus cannot be used for storing temporary data. In other computing environments such as PCs and servers, memory swapping is effectively applied for the purpose of solving the temporary memory usage increase problem, but it is limited to the embedded system. Failure to use memory swapping is a major loss in terms of solving the problem of memory usage increase issue.

Many studies have been made to overcome limitations of the embedded system. Zram and Zswap provided by Linux kernel, which is open software, proposes a technique of compressing data and storing the compressed data in a memory area in order to overcome the problem that the embedded system cannot store memory data in a flash memory.

Zram is an open source block device driver supported by the Linux kernel 3.14 version in 2010. Zram compresses memory page delivered by a swapping algorithm of the kernel and stores the compressed memory page in a kernel memory. Zmalloc memory allocator is used for storing the compressed memory page in a kernel memory. Zram uses lz0 as its basic compression algorithm, and uses various compression algorithms such as lz4, lz4hc, 842, and the like. Since Zram operates as a block device, Zram can operate by adding a device driver without modifying another kernel code. In addition, since the compressed memory page is stored in the kernel memory, Zram can be easily used in an embedded system where an actual storage device for swap partition is not present.

Zswap is a memory management function of the Linux kernel supported from the Linux 3.11 version in 2013. FIG. 2B shows the operation structure of Zswap. Zswap is a part of a memory manager function of the kernel, and compresses and stores the swapped page in a storage device instead of using the swapped page in a storage device. When a kernel memory space is insufficient, Zswap stores the swapped page in the storage device. In order to store the swapped page in the kernel memory, Zswap uses Zhud memory allocator and supports Zsmalloc memory allocator. Zswap also provides compression algorithms supported by the kernel, such as lz0 and lz4. Zswap has the advantage of compressing a memory page and storing the compressed memory page in a kernel memory when swap partition is present and using the swap partition together.

Compressing and storing data such as Zram and Zswap has the limitations on a compression ratio and a performance according to a data pattern. By using an algorithm with a high compression ratio, the significant amount of data is compressed and a memory space is saved accordingly. However, performance loss due to compression and decompression significantly occurs when a memory page is swapped or the swapped memory page is read. On the contrary, if a performance-oriented compression algorithm is selected, a compression ratio is reduced and a memory space saving effect due to memory data compression becomes insignificant.

For example, when lz4hc or 842 algorithm is applied to increase a compression ratio, performance is significantly degraded compared to other algorithms. When lz0 algorithm is applied to improve performance, a compression ratio is significantly reduced. In the case of the data pattern, lz4 algorithm is of advantage in terms of compression ratio and performance.

However, with the exception of specific data pattern, the compression performance of Zram in a typical smart TV product scenario is about 75% efficient and there is a limit to achieve 70% or more of memory savings.

SUMMARY

An aspect of the exemplary embodiments relates to providing an electronic apparatus for performing memory swapping optimization to minimize resource usage and a controlling method thereof.

According to an exemplary embodiment, there is provided an electronic apparatus including a memory configured to store computer executable instructions, and a processor configured to, by executing the computer executable instructions, based on a request for executing a program being received and an available capacity of a first area of the memory to be allocated to the program being insufficient, swap-out page data stored in the first area to a second area of the memory, wherein the processor is further configured to swap out the page data partially or entirely based on an attribute of the page data.

The processor may be further configured to identify an attribute of the page data based on an address on a first area in which the page data is stored.

The processor may be further configured to, based on a part of the page data being restorable, identify an attribute of the page data as a first attribute, and based on the page data not including restorable data, identify an attribute of the page data as a second attribute, and based on an attribute of the page data being the first attribute, swap out a part of data that remains after restorable data is discarded from the page data, and based on an attribute of the page data being the second attribute, swap out the page data entirely.

The processor may be further configured to, based on the partially swapped data being swapped in from the second area to the first area, restore data discarded when the part of data is swapped out.

The processor may be further configured to identify an attribute of the page data based on pre-generated attribute information with respect to the page data.

The processor may be further configure to add the attribute information to the page data and store in the first area.

The processor may be further configured to compress the page data to be swapped out by using a specific compression algorithm and swap out the compressed data to the second area, and wherein the specific compression algorithm is selected out of a loss compression algorithm or a lossless compression algorithm based on the attribute of the page data.

The processor may be further configured to, based on the page data to be swapped out being one of image data and video data, identify an attribute of the page data to be swapped out as a first attribute, and based on an attribute of the page data to be swapped out not being the first attribute, identify an attribute of the page data to be swapped out as a second attribute, and based on an attribute of the page data to be swapped out being the first attribute, compress the page data to be swapped out by using a loss compression algorithm, and based on an attribute of the page data to be swapped out being the second attribute, compress the page data to be swapped out by using a lossless compression algorithm.

The processor may be further configured to store metadata with respect to the used specific compression algorithm in the second area, and based on the compressed data that is stored in the second area being swapped-in to the first area, decompress the compressed data based on the metadata.

According to an exemplary embodiment, there is provided a method for controlling an electronic apparatus including receiving a request for executing a program, and based on an available capacity of a first area of a memory of the electronic apparatus to be allocated to the program being insufficient, swapping-out page data stored in the first area to a second area of the memory, wherein the swapping out comprises swapping out the page data partially or entirely based on an attribute of the page data.

The swapping out may include identifying an attribute of the page data based on an address on a first area in which the page data is stored.

The swapping out may include, based on a part of the page data being restorable, identifying an attribute of the page data as a first attribute, and based on the page data not including restorable data, identifying an attribute of the page data as a second attribute, and based on an attribute of the page data being the first attribute, swapping out a part of data that remains after restorable data is discarded from the page data, and based on an attribute of the page data being the second attribute, swapping out the page data entirely.

The method may further include, based on the partially swapped out data being swapped in from the second area to the first area, restoring data discarded when the part of data is swapped out.

The swapping out may include identifying an attribute of the page data based on pre-generated attribute information with respect to the page data.

The method may further include adding the attribute information to the page data and storing in the first area.

The swapping out may include compressing the page data to be swapped out by using a specific compression algorithm and swapping out the compressed data to the second area, wherein the specific compression algorithm is selected out of a loss compression algorithm or a lossless compression algorithm based on the attribute of the page data.

The swapping output may include based on the page data to be swapped out being at least one of image data and video data, identifying an attribute of the page data to be swapped out as a first attribute, and based on an attribute of the page data to be swapped out not being the first attribute, identifying an attribute of the page data to be swapped out as a second attribute, and based on an attribute of the page data to be swapped out being the first attribute, compressing the page data to be swapped out by using a loss compression algorithm, and based on an attribute of the page data to be swapped out being the second attribute, compressing the page data to be swapped out by using a lossless compression algorithm.

The method may further include storing metadata with respect to the used specific compression algorithm in the second area, and based on the compressed data that is stored in the second area being swapped-in to the first area, decompressing the compressed data based on the metadata.

According to an exemplary embodiment, there is provided a computer readable recording medium that stores a program for executing a controlling method of an electronic apparatus, wherein the controlling method comprises receiving a request for executing a program, and based on an available capacity of a first area of a memory of the electronic apparatus to be allocated to the program being insufficient, swapping-out page data stored in the first area to a second area of the memory, wherein the swapping-out comprises swapping out the page data partially or entirely based on an attribute of the page data.

DETAILED DESCRIPTION OF EXAMPLE EMBODIMENTS

Figure 1:
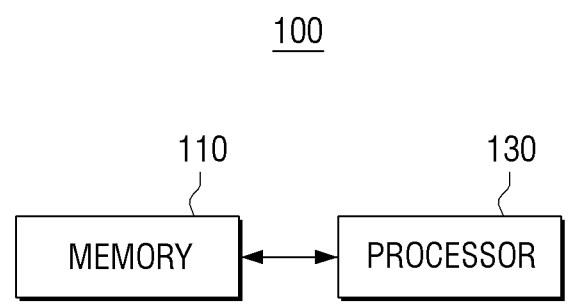
FIG. 1 is a block diagram provided to explain configuration of an electronic apparatus according to an embodiment of the present disclosure.

Hereinafter, the present disclosure will be described in detail with reference to the drawings. In the following description, the configuration which is publicly known but irrelevant to the gist of the present disclosure could be omitted. In addition, the following embodiments may be modified into various other forms, and the scope of the technical spirit of the present disclosure is not limited to the following examples. Rather, these embodiments are provided so that the present disclosure will be more thorough and complete, and will fully convey the scope of the technical spirit of the present disclosure to those skilled in the art.

It is to be understood that the disclosure herein is not intended to limit the scope of the invention to the specific embodiments but includes various modifications, equivalents, and/or alternatives of the embodiments. In the description of the drawings, like reference numerals refer to like elements throughout the description of drawings.

According to the present disclosure, the expression "include/comprise" "including/comprising" used in the specification represents that one or more components, steps, operations, and elements exist or are added, and does not exclude the presence of additional features.

In the present disclosure, the expressions "A or B," "at least one of A and/or B," or "one or more of A and/or B," and the like include all possible combinations of the listed items. For example, "A or B," "at least one of A and B," or "at least one of A or B" refers to (1) includes at least one A, (2) includes at least one B or (3) includes at least one A and at least one B.

The terms such as "first," "second," and so on may be used to describe a variety of elements, but the elements should not be limited by these terms. The terms are used simply to distinguish one element from other elements. The use of such ordinal numbers should not be construed as limiting the meaning of the term. For example, the components associated with such an ordinal number should not be limited in the order of use, placement order, or the like. If necessary, each ordinal number may be used interchangeably.

In an exemplary embodiment, 'a module', 'a unit', or 'a part' perform at least one function or operation, and may be realized as hardware, such as a processor or integrated circuit, software that is executed by a processor, or a combination thereof. In addition, a plurality of 'modules', a plurality of 'units', or a plurality of 'parts' may be integrated into at least one module or chip and may be realized as at least one processor except for 'modules', 'units' or 'parts' that should be realized in a specific hardware.

When an element (e.g., a first constituent element) is referred to as being "operatively or communicatively coupled to" or "connected to" another element (e.g., a second constituent element), it should be understood that each constituent element is directly connected or indirectly connected via another constituent element (e.g., a third constituent element). However, when an element (e.g., a first constituent element) is referred to as being "directly coupled to" or "directly connected to" another element (e.g., a second constituent element), it should be understood that there is no other constituent element (e.g., a third constituent element) interposed therebetween.

The expression "configured to" as used in the present disclosure can be replayed by, for example, "suitable for", "having the capacity to," "designed to", "adapted to", "made to" or "capable of" depending on the situation. The term "configured to (or set to)" may not necessarily mean "specifically designed to" in hardware. Instead, in some circumstances, the expression "a device configured to" may mean that the device "is able to~" with other devices or components. For example, "a sub-processor configured to (or set to) execute A, B, and C" may be implemented as a processor dedicated to performing the operation (e.g., an embedded processor), or a generic-purpose processor (e.g., a CPU or an application processor) that can perform the corresponding operations.

Furthermore, unless defined otherwise, all the terms used in this specification including technical and scientific terms have the same meanings as would be generally understood by those skilled in the related art. The terms defined in generally used dictionaries should be construed as having the same meanings as would be construed in the context of the related art, and unless clearly defined otherwise in this specification, should not be construed as having idealistic or overly formal meanings.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the disclosure, and will not be interpreted in an idealized or overly formal sense unless expressly so defined herein.

Furthermore, unless defined otherwise, all the terms used in this specification including technical and scientific terms have the same meanings as would be generally understood by those skilled in the related art. The terms defined in generally used dictionaries should be construed as having the same meanings as would be construed in the context of the related art, and unless clearly defined otherwise in this specification, should not be construed as having idealistic or overly formal meanings. Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the example embodiments to those skilled in the art.

An electronic device according to various embodiments of the present disclosure may be, for example, a smartphone, a tablet personal computer (PC), a mobile phone, a video phone, an e-book reader, a desktop personal computer (PC), a laptop personal computer (PC), a netbook computer, a workstation, a server, a personal digital assistant (PDA), a portable multimedia player (PMP), an MP3 player, a mobile medical device, a camera, or a wearable device. According to various embodiments, a wearable device may be one of an accessory type (e.g., a watch, a ring, a bracelet, a necklace, glasses, a contact lens or a head-mounted-device (HMD), textile or all-in-one clothing type (e.g., electronic apparel), a body attachment type (e.g., skin pads or tattoos), or a bio-transplantation type (e.g., implantable circuits).

In some embodiments, the electronic device may be a home appliance. Home appliances may include, for example, televisions, digital video disk players, audios, refrigerators, air conditioners, vacuum cleaners, ovens, microwaves, washing machines, air cleaners, set-top boxes, a home automation control panel, a security control panel, a TV box (e.g., Samsung HomeSync, Apple TV or Google TV), a game console (e.g., Xbox, PlayStation, etc.), an electronic dictionary, an electronic key, a camcorder, or an electronic frame.

In another embodiment, the electronic device may be used in a variety of medical devices (e.g., various portable medical measurement devices such as a blood glucose meter, a heart rate meter, a blood pressure meter or a body temperature meter), or may be at least one of magnetic resonance angiography (MRA), magnetic resonance imaging (MRI), computed tomography (CT), a photographic equipment, or an ultrasonic device, a navigation, a global navigation satellite system (GNSS), an event data recorder (EDR), a flight data recorder (FDR), a car infotainment device, an marine electronic equipment (e.g., marine navigation devices, gyro compasses, etc.), avionics, security devices, head units for vehicles, industrial or home robots, an automatic teller's machine of a financial institution, a point of sale of a store, or an internet of things (e.g., a light bulb, various sensors, an electric or gas meter, a sprinkler device, a smoke alarm, a thermostat, a street lamp, a toaster, an exercise device, a hot water tank, a heater, a boiler, etc.

According to some embodiments, the electronic device may be a piece of furniture or a part of a building/structure, an electronic board, an electronic signature receiving device, a projector, or various measurement devices (e.g., water, electricity, gas, or radio wave measuring instruments, etc.). In various embodiments, the electronic device may be a combination of one or more of the various devices described above. The electronic device according to some embodiments may be a flexible electronic device. Further, the electronic device according to the embodiment of the present disclosure is not limited to the above-described devices, and may include technological advancement.

Hereinafter, the present disclosure will be described in detail with reference to the accompanying drawings.

FIG. 1 is a block diagram provided to explain configuration of an electronic apparatus 100 according to an embodiment of the present disclosure.

Referring to FIG. 1, the electronic apparatus 100 may include a memory 110 and a processor 130. Although not shown, according to an embodiment, the electronic apparatus 100 may further include hardware/software configurations obvious to those skilled in the art.

The memory 110 may include at least one of a volatile memory and a non-volatile memory. The volatile memory may be, for example, a dynamic RAM (DRAM), a static RAM (SRAM), a synchronous dynamic RAM (SDRAM), or the like. Examples of the nonvolatile memory include one time programmable ROM (OTPROM), programmable ROM (PROM), erasable and programmable ROM (EPROM), electrically erasable and programmable ROM (EEPROM), mask ROM, flash ROM, flash memory (e.g., NAND flash or NOR flash), a hard drive, a solid state drive (SSD), etc.

The memory 110 may include an external memory. The external memory may be a flash drive such as a compact flash (CF), a secure digital (SD), a micro secure digital (Micro-SD), a mini secure digital (Mini-SD), an extreme digital (xD) or the like. The external memory may be functionally and/or physically connected to the electronic device 100 via a variety of interfaces.

The memory 110 may store commands or data related to constituent elements of the electronic apparatus 100.

The memory 110 may be defined by a plurality of blocks or portions referred to as memory pages (or pages). The size of one page may be, for example, 1 to 8 KB according to an operating system. Data may be managed on a page basis. Data stored in one page may be referred to as page data.

The processor 130 may include one or more of a central processing unit (CPU), an application processor (AP), or a communication processor (CP). The processor 130 may perform, for example, operations or data processing relating to the control and/or communication of at least one other constituent element of the electronic device 100.

The processor 130 may perform various operations by executing computer executable instructions stored in the memory 110. For example, the processor 130 may manage to store data in the memory 110.

According to an embodiment, the processor 130 may allocation a portion of the memory 110 to a corresponding program upon the request for executing a program. In this case, the program may include applications, operating system programs, modules, or the like.

For example, the processor 130 may allocate an area which is not allocated by another program in a first area to a program that is request to be executed. The first area may be a storage area required for executing a program, and could be a system memory area. In the case of Linux, the first area may include a stack area, a heap area, data and bass area and code text area.

The processor 130 may allocate an area which is not assigned by another program in the first area to a program requested to be executed based on a page of a predetermined size. According to an embodiment, the processor 130 may allocate consecutive pages to one process, but the present disclosure is not limited thereto.

When an available capacity of the first area of the memory 110 for allocation to a program requested to be executed is insufficient, the processor 130 may swap out at least one page data in the first area to a second area of the memory 110. The processor 130 may identify that the available capacity of the first area is insufficient when the available capacity of the first area of the memory 110 is small than or equal to a predetermined capacity.

Swapping out refers to moving data in a process that is currently not being executed, among currently scheduled processes, that is, a process that is in a ready state or a waiting state from the first area to the second area and storing the data.

The second area of the memory 110 may be an area designated to move data that is expected to be temporarily unavailable from the first area and store the data to achieve an available capacity of the first area when the capacity of the first area which is a system memory area is insufficient. The size of the second area may be fixed or may variable.

According to an embodiment, the first area and the second area of the memory 110 may be provided in a non-volatile memory such as DRAM, SRAM, etc. According to another embodiment of the present disclosure, the first area of the memory 110 may be provided in a volatile memory and the second area may be provided in a non-volatile memory such as flash memory, hard drive, SSD (solid state drive), etc. Both the first area and the second area of the memory 110 may be provided in an internal memory, or the first area may be provided in an internal memory and the second memory may be provided in an external memory.

According to an embodiment, the processor 130 may swap out at least one page data which has not been used for a long time among page data of the first area to the second area. According to another embodiment, the processor 130 may swap out at least one page data having a low frequency of use among page data of the first area to the second area.

The processor 130 may reduce the size of the page data of the first area and swap out the page data of a reduced size to the second area to efficiently use a storage area.

Conventionally, the size of data may be reduced by compressing and swapping out data, but it is difficult to overcome the limitation on a compression ratio and performance limitation according to a data pattern since all data is lossless compressed and swapped out. For example, the size of data may be significantly reduced by using a compression algorithm with a high compression ratio, so that memory space may be saved. However, the compression and decompression of data may result in significant performance loss. When an algorithm with a low compression ratio is used to minimize the performance loss, the problem lies in that the memory space may be insignificantly saved.

Thus, according to embodiments of the present disclosure, data discarding (full discarding or partial discarding), loss compression and lossless compression may be selectively applied according to an attribute (or a state) of page data to improve a compression ratio and a performance of memory swapping.

Data discarding may refer to removing unnecessary portion from page data. The unnecessary portion may be a part which is not necessarily necessary for processing or a part which can be restored later on.

The lossless compression method indicates that there is no loss, which means that when is compressed and decompressed again, the data can be restored to the data before compression.

The loss compression method refers to a case where the data which is compressed and decompressed again cannot be 100% restored to the data before compression.

In other words, according to the embodiments of the present disclosure, the attribute of the page data may be identified and discarded if unnecessary data is included. In the case where it is not necessary to completely recover to the data before compression upon decompression, the loss compression may be applied, and only when total recovery is necessary, the lossless compression may be applied. As such, the compression ratio may be increased by applying an appropriate method according to the data attribute, thereby minimizing the performance degradation.

According to an embodiment of the present disclosure, the processor 130 may partially or entirely swap out the page data to the second area of the memory 110 based on the attribute of the page data stored in the first area of the memory 110.

Partially swapping out may refer that some unnecessary data out of the page data is discarded and the remaining data is swapped out, and entirely swapping out may refer to swapping out all the page data.

The processor 130 may discard entire page data based on the attribute of the page data when the available capacity area of the first area is insufficient.

According to an embodiment, the attribute of the page data may be identified based on pre-generated attribute information with respect to the page data. The attribute information may be included in the page data. According to another embodiment, the attribute of the page data may be identified based on the address of the memory 110 where the page data is stored.

When the attribute of the page data is identified by the attribute information included in the page data, the attribute information included in the page data may be provide by a program from which the page data came from, or generated when the processor 130 allocates a memory to a program and added to each page data. According to an embodiment, the attribute information included in the page data may be flag information.

When the attribute of the page data is identified based on the address where the page data is stored, for example, it is pre-defined that page data stored within a specific address range on the first area of the memory 110 has a first attribute, and page data stored within another specific address range on the first area has a second attribute. As such, an attribute of the page memory may be identified based on the address where the page memory is stored. For example, the first address range may be defined as an area where page data (page data to be protected) including the first attribute is stored, and the second address range may be defined as an area where page data (page data that can be randomly manipulated) including the second attribute is stored. When the page data stored in the first address range is swapped out, entire page data may be swapped out, and when the page data stored in the second address range is swapped out, unnecessary portion of the page data may be discarded, and the remaining data may be swapped out. The processor 130 may generate table information indicating which address on the first area of the memory 100 corresponds to which attribute. Such table information may be referred to determine which memory space to allocate to a program, and referred when the processor 130 determines whether to swap out a memory partially or entirely.

According to an embodiment, page data which can be partially swap out may be set to be partially swapped out at all times. However, according to another embodiment, page data may be set to be swapped out entirely in specific cases. When the page data is set to be swapped out entirely, whether to swap out the page data which is set to be partially swapped partially or entirely may be determined based on the available capacity of the second area of the memory 110. When the available capacity of the second area of the memory 110 is sufficient, even the page data that can be partially swapped out may be entirely swapped out. For example, the page data that can be partially swapped out is further subdivided into two types depending on the available capacity of the second area. One type of the data can selectively be entirely swapped out or partially swapped out, and the other type of the data can be always partially swapped.

According to another embodiment of the present disclosure, the processor 130 may input page data to an artificial intelligence model trained by an artificial intelligence algorithm, identify an attribute of the input page data, and determine whether to swap out the page data partially or entirely based on the identified attribute.

The artificial intelligence model may be trained so as to have a criterion as to how the input data is understood, recognized, identified, determined, or inferred. According to an embodiment, the artificial intelligence model may be trained through supervised learning using at least a part of training data as a criterion. Alternatively, the artificial intelligence model may be trained through unsupervised learning in which a determination criterion for determining a situation is identified by learning by itself using training data without any guidance. Alternatively, the artificial intelligence model may be trained through reinforcement learning using feedback as to whether the result of the situation determination according to training is correct.

The artificial intelligence model to identify the attribute of the page data may be trained and generated by the electronic apparatus 100, and the electronic apparatus 100 may externally receive and use a pre-generated artificial intelligence model.

The processor 130 may identify the attribute of the page data as the first attribute when page data is partially restorable, and the attribute of the page data as the second attribute when the page data does not include restorable data. When the attribute of the page data is the first attribute, the processor 130 may partially swap out the data that remains after the restorable data is discarded from the page data, and swap out the entire page data when the attribute of the page data is the second attribute.

Swapping in the data stored in the second area of the memory 110 to the first area, the processor 130 may restore the data discarded when swapping out, add the restored data and swap-in the data.

According to another embodiment of the present disclosure, the processor 130 may compress at least one page data to be swapped out by using a specific compression algorithm, and swap out the compressed data to the second area of the memory 110. The processor 130 may compress page data separately, or compress two or more page data together.

The specific compression algorithm may be selected out of a loss compression algorithm or a lossless compression algorithm based on the attribute of the page data. When the attribute of the page data does not need to be restored exactly the same as the data before compression upon decompression, the compression ratio may be increased and the performance of swapping may be improved by compressing the page data using a loss compression algorithm. The attribute of the page data may be identified based on the address where the page data is stored or the attribute information included in the page data, or by using an artificial intelligence model.

Examples of data which does not need to be restored exactly the same as the data before compression upon decompression include image data (video or still image) or audio data. For example, BMP data may be loss-compressed into JPEG data. Data which needs to be restored exactly the same as the data before compression upon decompression may be importance data, for example, data related to data structure.

When page data to be swapped out is at least one of image data and video data, the processor 130 may identify the attribute of the page data to be swapped out as the first attribute, and when the attribute of the page data to be swapped out is not the first attribute, the processor 130 may identify the attribute of the page data as the second attribute. When the attribute of the page data to be swapped out is the first attribute, the processor 130 may compress the page data to be swapped out by using the loss compression algorithm, and when the attribute of the page data to be swapped out is the second attribute, the processor 130 may compress the page data to be swapped out by using the lossless compression algorithm.

The processor 130 may store metadata to be referred for identifying which algorithm is used to compress the page data in the second area of the memory 110 together with the compressed data. The processor 130 may decompress the compressed data based on the metadata stored in the second area when swapping in the compressed data that is stored in the second area to the first area.

According to various embodiments of the present disclosure, a swapping method may be determined on a page data basis, or on a program basis. For example, each application may have information on an importance level, and when it is determined that the available capacity area of the memory 110 is insufficient, the processor 130 may perform memory swapping in one of data discard, loss compression, lossless compression, etc. according to an importance level of an application corresponding to an executed process. The importance level of the application may be determined by the processor 130 or pre-defined in an application.

According to another embodiment of the present disclosure, when the storage area of the second area of the memory 110 is insufficient, a part of the data stored in the second area may be moved to a third area of the memory 110. The first area and the second area of the memory 110 may be provided in a volatile memory, and the third area may be provided in a non-volatile memory. The first area of the memory 110 may be provided in a volatile memory, and the second area and the third area may be provided in a non-volatile memory. The first area and the second area of the memory 110 may be provided in an internal memory of the electronic apparatus 100, and the third area may be provided in an external memory of the electronic apparatus 100.

Figure 2:
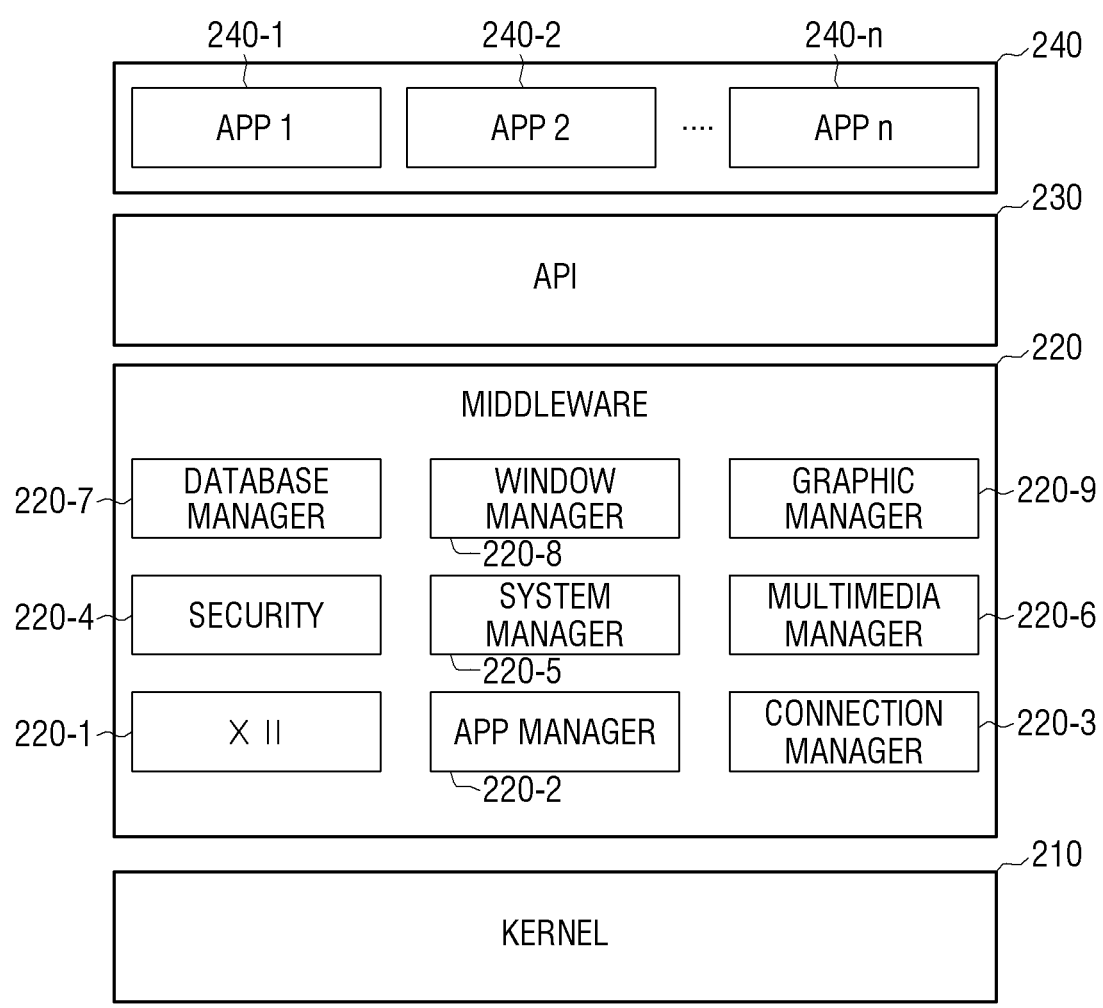
FIG. 2 is a view provided to explain a structure of software stored in an electronic apparatus according to an embodiment of the present disclosure.

FIG. 2 is a view provided to explain a structure of software stored in the electronic apparatus 100 according to an embodiment of the present disclosure. Referring to FIG. 2, the memory 110 may store software including a kernel 210, a middleware 220, an application programming interface (API) 230, an application module 240, and the like. At least a part of the kernel 210, the middleware 220, and the application programming interface (API) 230 may be referred to as an operating system (OS). The operating system may be, for example, android, iOS, windows, symbian, tizen, bada, or the like.

The kernel 210 may control or mange system resources (e.g., the memory 110, the processor 130, etc.) used for executing an operation or a function embodied in other programs (e.g., the middle wear 220, the API 230 or the application 240). The kernel 210 may access an individual constituent element of the electronic apparatus 100 in the middleware 220, the API 230 or the application 240 and provide an interface for controlling and managing the system resources. The kernel 210 may control or manage a swap task for managing a memory.

The kernel 210 may control, allocate or recover system resources. According to an embodiment, the kernel 210 may include a process managing unit, a memory managing unit or a file system management unit. The kernel 210 may allocate at least a part of the memory 110 to a program, or recover a partial area of the memory 110 which is allocated to a program. According to an embodiment, the kernel 210 may detect the first area of the memory 110 to be allocated to a program, that is, a situation where the capacity of the system memory is insufficient, and swap out data to the second area of the memory 110. The kernel 210 may partially or entirely swap out data according to the attribute of data to be swapped out. The kernel 210 may swap out data through lossless compression or loss compression according to the attribute of the data to be swapped out. The kernel 210 may swap in the data stored in the second area of the memory 110 to the first area. The kernel 210 may decompress the compression when the data is swapped in, and when there is data discarded by partially swapping out, restore the discarded data.

The middleware 220 may perform an intermediary function so that the API 230 or the application 240 may communicate with the kernel 210 to exchange data. In addition, the middleware 220 may process at least one of more of task requests received from the application 240 according to the priority. For example, the middleware 220 may give the priority for using the system resource (e.g., the memory 110, the processor 130, etc.) to at least one of the applications 240. For example, the middleware 220 may process at least one or more task requests according to the priority assigned to at least one, and perform scheduling or load balancing with respect to at least one task request.

The middleware 220 may provide a function commonly required by the application 240, or various functions to the application 240 through the API 230 so that the application 240 may efficiently use the limited system source in the electronic apparatus 100. According to an embodiment, the middleware 220 may include at least one of an X11 module 220-1, an application manager 220-2, a connection manager 220-3, a security module 220-4, a system manager 230-5, a multimedia manager 220-6, a database manager 220-7, a window manager 220-8, and a graphic manager 220-9.

The X11 module 230-1 may be a module that receives various event signals from various hardware provided in a user terminal device 1000. The event may be an event where a system alarm occurs, an event where a specific program is executed or terminated, or the like.

The APP manage 220-2 may be a module for managing execution states of various types of applications 240. The APP manage 220-2 may call and execute an application corresponding to the event when detecting an application execution event from the X11 module 230-1.

The connection manager 230-3 may be a module for supporting wired/wireless network connection. The connection manager 230-3 may include various detailed modules such as a DNET module, a UPnP module, and the like.

The security module 220-4 may be a module for supporting certification, permission, secure storage with respect to hardware.

The system manager 230-5 may monitor the state of each constituent element in the user terminal device 1000, and provide a monitoring result to other modules.

The multimedia manager 220-6 may identify a format required for reproducing various media files, and perform encoding or decoding of a media file by using a codec suitable for the format.

The database manager 220-7 may generate, retrieve, or change database used by at least one application 240.

The window manage 220-8 may manage GUI resources used in a screen.

The graphic manager 220-9 may manage a graphic effect provided to a user and a user interface related thereto. The middleware 220 may provide a module specialized for each type of operating system to provide a differentiated function. The middleware 220 may dynamically remove a part of the constituent elements or add new constituent elements.

The API 230 may, for example, include an interface for controlling a function provided by the kernel 210 or the middleware 220 by the application 240, for example, at least one interface or function (e.g., a command) for file control, window control, image processing, character control, etc.

The application module 240 may include applications 240-1 to 240-n for supporting various functions. The applications may be installed by default, or may be arbitrarily installed and used by a user during the use.

The software structure shown in FIG. 2 is merely an example, but the present disclosure is not limited thereto. Therefore, it should be understood that a part of the software can be omitted, modified or added as needed.

Figure 3:
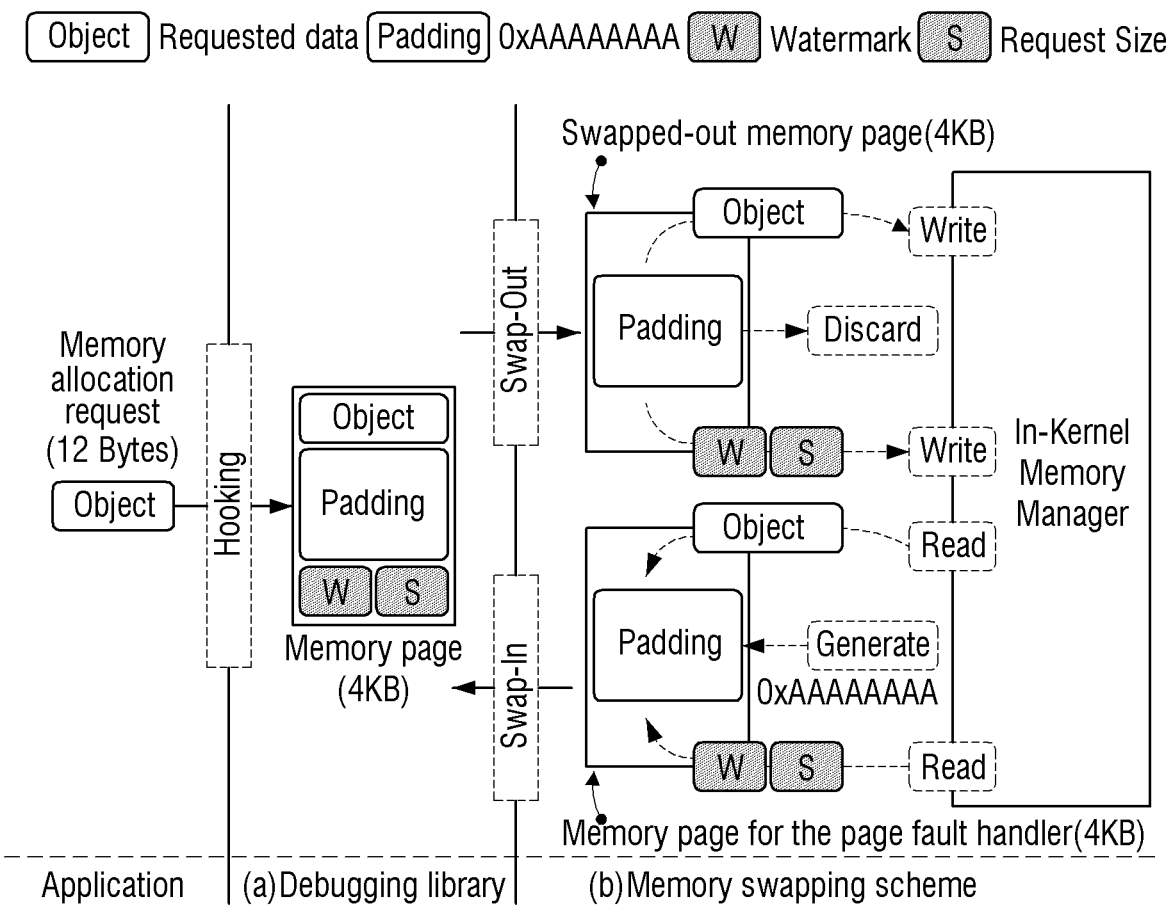
FIGS. 3, 4, 5, 6, and 7 are flowcharts provided to explain a method for controlling an electronic apparatus according to various embodiments of the present disclosure.

FIG. 3 is a view provided to explain an embodiment of the present disclosure where data is discarded and swapped out.

FIG. 3 illustrates an example of executing a DUMA tool for memory error checking in order to easily show the structure of data discarding. Data discarding is applied only when the DUMA tool is executed, but the present disclosure is not limited thereto.

Referring to FIG. 3, an application may allocate a memory of 12 Bytes. However, a physical memory of 4 KB is actually used while a DUMA tool is executed. In the case of the conventional lossless compression algorithm, the page data of 4 KB may be compressed, and the data of size larger than that desired by an application may be stored.

According to an embodiment of the present disclosure, watermark and size information for identifying an attribute of the page data may be added to page data for applying data discarding, and the attribute of each memory page data may be detected in a memory swapping algorithm of the kernel. Only the data allocated by an actual application may be stored with respect to the detected page data with reference to the information. Adding the watermark and size information to the page data is merely an example, and the present disclosure is not limited thereto.

As shown in FIG. 3, various advantages are obtained by reducing data size by removing unnecessary data through a method of identifying page data which can be data discarded. Preferentially, saving only necessary data may results in reducing the size of the required storage space and performance overhead required for compression. If the separated data is smaller than the existing compressed data and performance is important, the performance overhead required for compression can be completely excluded by storing only the separated data.

Figure 4:
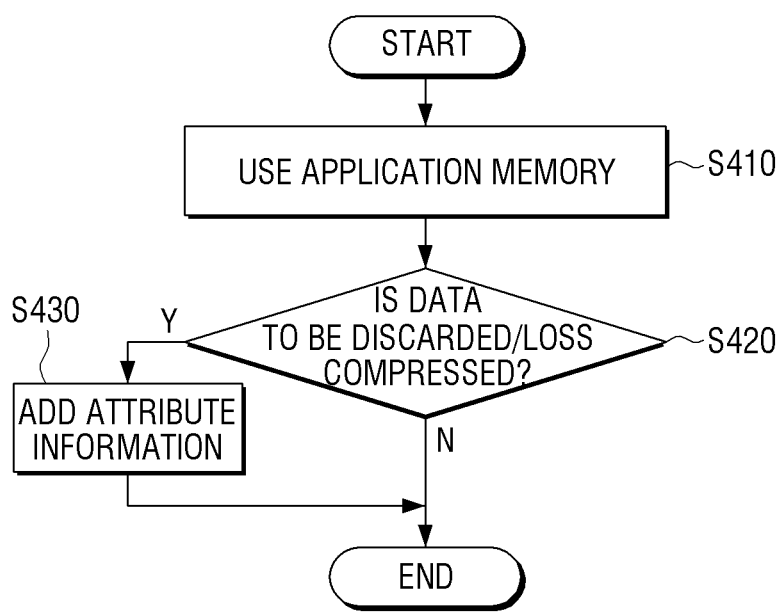

FIG. 4 is a view provided to explain an operation scenario of an application according to an embodiment of the present disclosure.

Referring to FIG. 4, the processor 130 may allocate the first area of the memory 100 to an application upon the execution request of the application, and the application may use the area at step S410.

The processor 130 may determine whether the page data of the application process stored in the first area of the memory 110 is to be discarded or a loss compressed at step S420. For example, when unnecessary data is included in the page data, it is determined that the data is to be discarded, and when the page data is media data such as image data, audio data, etc., it is determined that the data is to be loss-compressed.

When it is determined that the data is to be discarded and loss-compressed, the processor 130 may add the attribute information to the page data at step S430. The attribute information may be referred when the data pages are to be swapped out. When the data is not discarded, or loss-compressed, the attribute information may not be added. When the attribute information is not added, it is determined that the data is to be lossless-compressed when swapped out later on.

Figure 5:
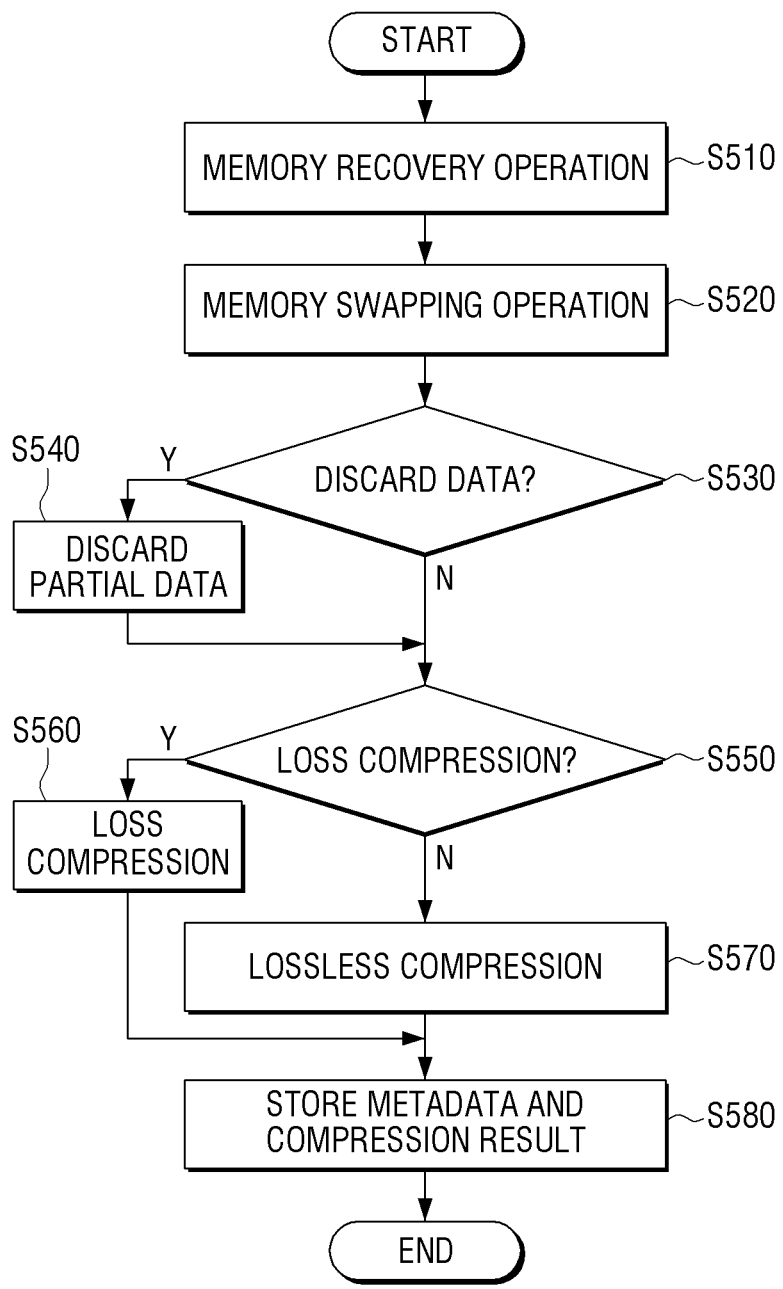

FIG. 5 is a view provided to explain an embodiment of a memory recovery scenario of a kernel to which the methods of embodiments of the present disclosure are applied when the available capacity of the first area of the memory 110 is insufficient.

Referring to FIG. 5, when the available capacity of the first area of the memory 110 is insufficient, a memory recovery routine of the kernel may be operated at step S510. The memory swapping operation may be performed at step S520.

The kernel may detect whether the page data to be swapped out is data to be discarded at step S530. The kernel may determine whether the data is to be discarded based on the attribute information included in the page data to be swapped out.

When the page data is to be discarded, unnecessary partial data may be discarded by referring the attribute information included in the page data or the pre-stored information at step S540.

The kernel may detect whether the page data is to be loss compressed based on the attribute information included in the page data at step S550. When the data is to be loss-compressed, the kernel may compress data by using a loss-compression algorithm at step S560. When the data is not to be loss-compressed, that is, the data is to be lossless compressed, data may be compressed by using a lossless compression algorithm at step S570.

The kernel may store metadata as to which compression algorithm is used and the compression result, that is, the compressed data in the second area of the memory 110 at step S580.

Figure 6:
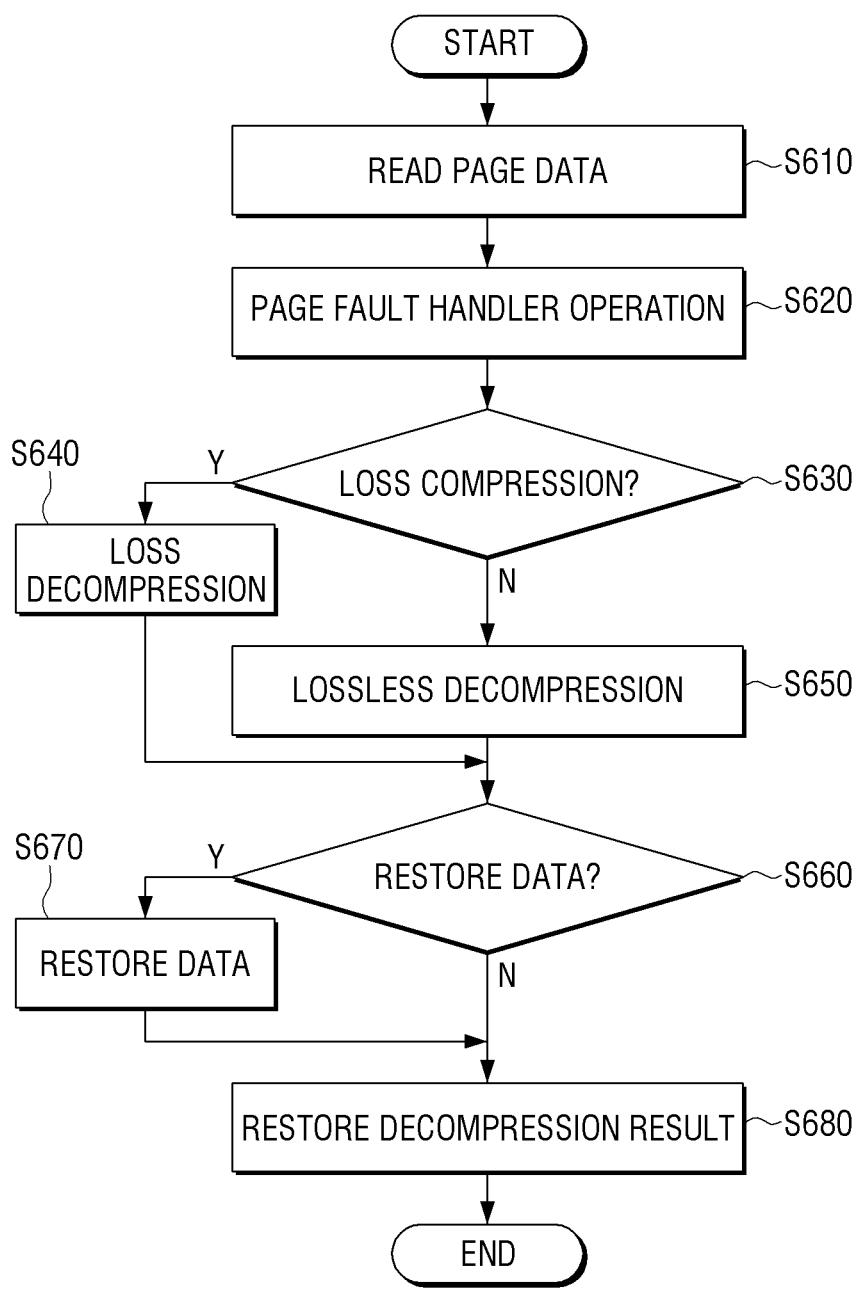

FIG. 6 is a view provided to explain an embodiment of a scenario where a memory management routine restores and recovers the swapped page data when an application accesses the swapped page data.

Referring to FIG. 6, an application may read the swapped out page data at step S610. In other words, when an application accesses the page where a page of a physical memory is not allocated, page fault may occur.

The kernel may operate a page fault handler for processing page fault at step S620. When the page fault handler operates, the kernel may requires the page data to a swapping algorithm.

The kernel may confirm whether the swapped page data is stored through loss-compression by reading the stored metadata at step S630. When the swapped page data is loss-compressed memory page, the loss-compression may be decompressed at step S640. When the swapped page data is stored through lossless compression, the lossless compression may be decompressed at step S650.

The kernel may confirm whether the decompressed data is restorable (or reproducible) at step S660. In other words, the kernel may confirm, when the data is loss-compressed, whether the data can be restored to data before compression, or when the data has been discarded, whether the discarded data is restorable.

When the data is restorable, the data may be restored at step S670. In addition, the page data generated as a result of decompression may be returned at step S680. In other words, the data may be swapped in to the first area of the memory 110.

Figure 7:
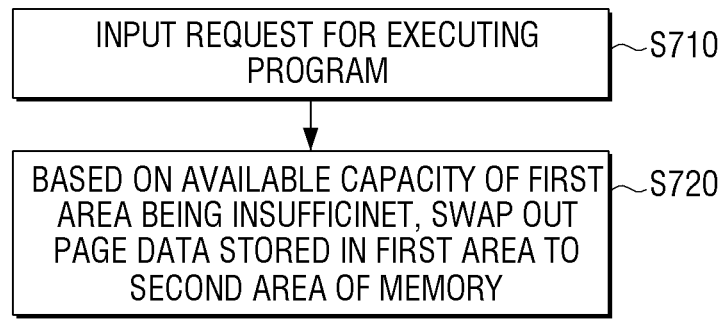

FIG. 7 is a view provided to explain a method for controlling an electronic apparatus according to an embodiment of the present disclosure. The flowchart shown in FIG. 7 may be configured with operations processed by the electronic apparatus 100 described herein. Therefore, although omitted from the following description, the description with respect to the electronic apparatus 100 may be applied to the flowchart shown in FIG. 7.

Referring to FIG. 7, the electronic apparatus 100 may receive a request for executing a program at step S710.

When the available capacity of the first area of the memory to be allocated to a program is insufficient, the electronic apparatus 100 may swap-out the page data stored in the first area to the second area at step S720. At step S720, the electronic apparatus 100 may swap out the page data partially or entirely based on the attribute of the page data.

The electronic apparatus 100 may identify the attribute of the data based on the address on the first area where the page data is stored.

The electronic apparatus 100 may identify the attribute of the page data as the first attribute when the part of page data is restorable, and when the page data does not include restorable data, identify the attribute of the page data as the second attribute. When the attribute of the page data is the first attribute, the electronic apparatus 100 may partially swap out the data that remains after the restorable data is discarded from the page data, and when the attribute of the page data is the second attribute, the electronic apparatus 100 may swap out the entire page data.

When the data that is partially swapped out is swapped-in from the second area to the first area, the data discarded when the data is partially swapped out may be restored.

The electronic apparatus 100 may identify the attribute of the page data based on the pre-generated attribute information with respect to the page data. In this case, the attribute information may be added to the page data and stored in the first area.

The electronic apparatus 100 may compress the page data to be swapped out by using a specific compression algorithm and swap out the compressed data to the second area. The specific compression algorithm may be selected out of a loss compression algorithm or a lossless compression algorithm based on the attribute of the page data.

The page data to be swapped out is at least one of image data and video data, the electronic apparatus 100 may identify the attribute of the page data to be swapped out as the first attribute, and when the attribute of the page data to be swapped out is not the first attribute, identify the attribute of the page data as the second attribute. When the attribute of the page data to be swapped out is the first attribute, the page data to be swapped out may be compressed by using a loss compression algorithm, and when the attribute of the page data to be swapped out is the second attribute, the page data to be swapped out may be compressed by using a lossless compression algorithm.

In this case, the electronic apparatus 100 may store metadata with respect to the used specific compression algorithm in the second area, and when the compressed data that is stored in the second area is swapped-in to the first area, the compressed data may be decompressed based on the metadata.

According to various embodiments of the present disclosure, a memory swapping response performance may be improved by maximizing a memory compression ratio using data discarding and lossless compression, and improving the performance of loss compression algorithm versus compression algorithm.

Figure 8:
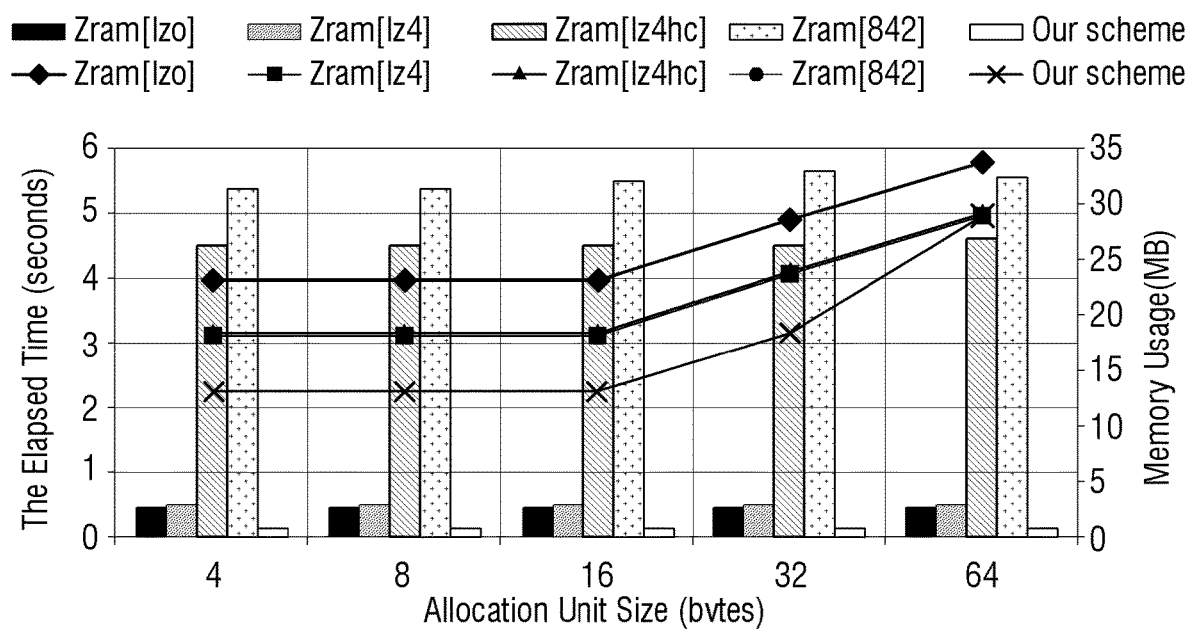
FIG. 8 is a view showing a result of comparing a compression algorithm of Zram with a technique of an embodiment of the present disclosure while executing a DUMA tool.

FIG. 8 shows a result of comparing a compression algorithm of Zram and a technique of the present disclosure during the execution of a DUMA tool. According to a result of benchmark comparison in FIG. 8, it is shown that the memory compression ratio may be increased by 1.8 times and the swapping response performance may be enhanced by up to 58 times. Such benchmark result shows a result of executing the performance-based settings, so it can be expected that if it is changed to a memory space saving-based settings, the compression ratio may be increased and the swapping response performance may be relatively degraded.

Figure 9:
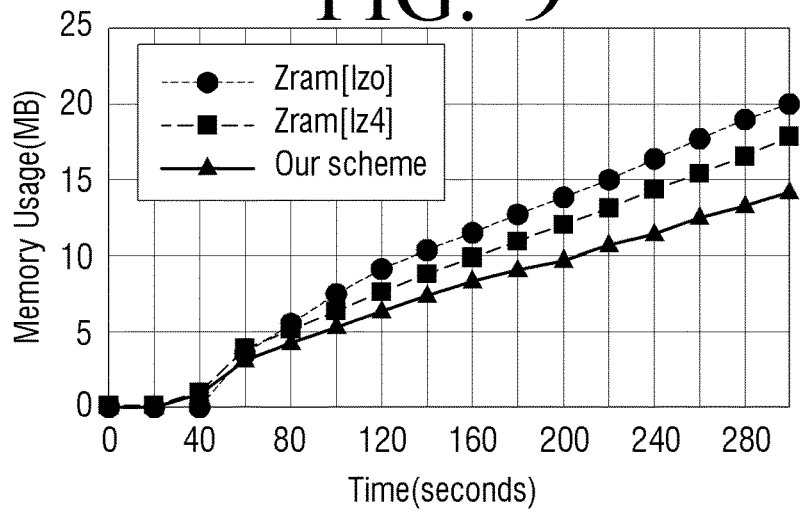
FIG. 9 is a view showing a result of comparing a compression algorithm of Zram with a technique of an embodiment of the present disclosure when a DUMA tool is applied to an actual application and executed.
Figure 9:
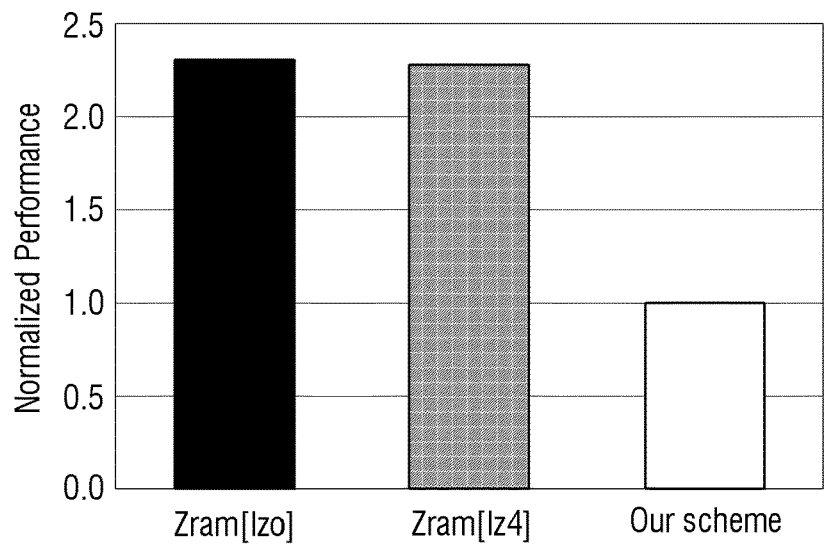
Figure 9:
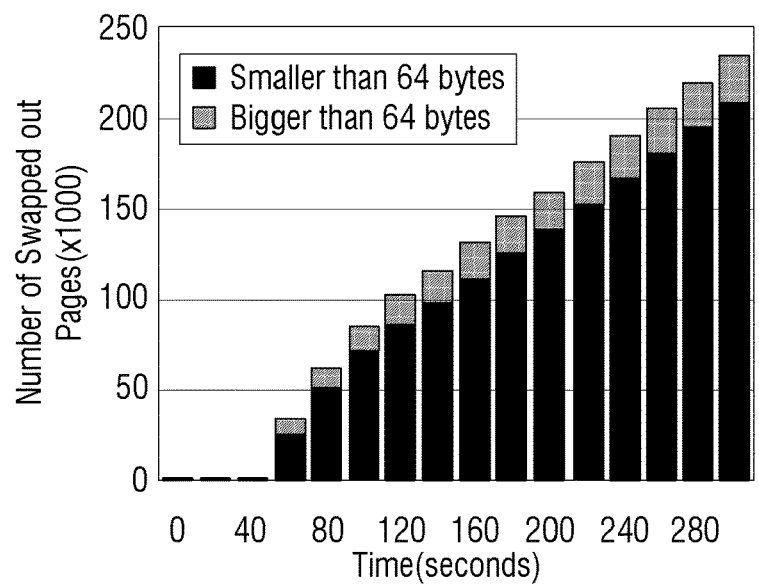

FIG. 9 is a view showing a result of comparing a compression algorithm of Zram with a technique of the present disclosure when a DUMA tool is applied to an actual application and executed.

Applying the technique of the present disclosure during kernel source code compression, the usage of the memory to be swapped may be reduced by 1.41 times and 1.24 times compared to lzo and lz4 algorithms, respectively.

The various embodiments described above may be implemented in software, hardware, or a combination thereof. When embodied in hardware, the present disclosure may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and an electrical unit for performing other functions. When embodied in software, embodiments such as the procedures and functions described herein may be implemented in separate software modules. Each of the software modules may perform one or more of the functions and operations described herein.

Various embodiment of the present disclosure may be embodied as software including commands stored in machine-readable storage media. The machine may be an apparatus that calls a command stored in a storage medium and is operable according to the called command, including an electronic device in accordance with the disclosed example embodiments (e.g., an electronic device 100). When the command is executed by a processor, the processor may perform the function corresponding to the command, either directly or under the control of the processor, using other components. The command may include code generated or executed by a compiler or an interpreter. The machine-readable storage medium may be provided in the form of a non-transitory storage medium. The 'non-temporary' means that the storage medium does not include a signal but is tangible, but does not distinguish whether data is stored semi-permanently or temporarily on a storage medium.

According to an embodiment, the method according to various embodiments disclosed herein may be provided in a computer program product. A computer program product may be traded between a seller and a purchaser as a commodity. A computer program product may be distributed in the form of a machine-readable storage medium (e.g., compact disc read only memory (CD-ROM)) or distributed online through an application store (e.g., PlayStore™) In the case of on-line distribution, at least a portion of the computer program product may be temporarily stored, or temporarily created, on a storage medium such as a manufacturer's server, a server of an application store, or a memory of a relay server.

Each of the components (e.g., modules or programs) according to various embodiments may consist of a single entity or a plurality of entities, and some subcomponents of the abovementioned subcomponents may be omitted, or other components may be further included in various embodiments. Alternatively or additionally, some components (e.g., modules or programs) may be integrated into one entity to perform the same or similar functions performed by each component prior to integration. Operations performed by modules, programs, or other components, in accordance with various embodiments, may be executed sequentially, in parallel, repetitively, or heuristically, or at least some operations may be performed in a different order, or omitted, or another function may be further added.

Although exemplary embodiments have been shown and described, it will be appreciated by those skilled in the art that changes may be made to these exemplary embodiments without departing from the principles and spirit of the present disclosure. Accordingly, the scope of the present invention is not construed as being limited to the described exemplary embodiments, but is defined by the appended claims as well as equivalents thereto.

What is claimed is:

1. An electronic apparatus, comprising:
   a memory configured to store computer executable instructions; and
   a processor configured to, by executing the computer executable instructions, based on a request for executing a program being received and an available capacity of a first area of the memory to be allocated to the program being insufficient, swap out page data stored in the first area to a second area of the memory,
   wherein the processor is further configured to identify an attribute of the page data based on whether the page data stored in the first area of the memory is to be discarded or loss compressed, add the attribute to the page data, compress the page data to be swapped out using a specific compression algorithm, swap out the compressed page data partially or entirely based on the attribute of the page data, store metadata with respect to the used specific compression algorithm in the second area, based on the compressed page data that is stored in the second area being swapped in to the first area, decompress the compressed page data based on the metadata, identify whether the decompressed data is restorable, restore the decompressed page data when the decompressed page data is restorable, and swap in the decompressed page data to the first area of the memory, and
   wherein the specific compression algorithm is selected from a loss compression algorithm or a lossless compression algorithm based on the attribute of the page data.

2. The electronic apparatus as claimed in claim 1, wherein the processor is further configured to identify the attribute of the page data based on an address in the first area in which the page data is stored.

3. The electronic apparatus as claimed in claim 1, wherein the processor is further configured to:
   based on a part of the page data being restorable, identify the attribute of the page data as a first attribute, and based on the page data not including restorable data, identify the attribute of the page data as a second attribute, and
   based on the attribute of the page data being the first attribute, swap out a part of data that remains after restorable data is discarded from the page data, and based on the attribute of the page data being the second attribute, swap out the page data entirely.

4. The electronic apparatus as claimed in claim 3, wherein the processor is further configured to, based on the partially swapped data being swapped in from the second area to the first area, restore data discarded when the part of data is swapped out.

5. The electronic apparatus as claimed in claim 1, wherein the processor is further configured to identify the attribute of the page data based on pre-generated attribute information with respect to the page data.

6. The electronic apparatus as claimed in claim 5, wherein the processor is further configure to add the attribute information to the page data and store in the first area.

7. The electronic apparatus as claimed in claim wherein the processor is further configured to:
   based on the page data to be swapped out being one of image data and video data, identify the attribute of the page data to be swapped out as a first attribute, and based on the attribute of the page data to be swapped out not being the first attribute, identify the attribute of the page data to be swapped out as a second attribute, and
   based on the attribute of the page data to be swapped out being the first attribute, compress the page data to be swapped out using the loss compression algorithm, and based on the attribute of the page data to be swapped out being the second attribute, compress the page data to be swapped out using the lossless compression algorithm.

8. A method for controlling an electronic apparatus, comprising:
   receiving a request for executing a program; and
   based on an available capacity of a first area of a memory of the electronic apparatus to be allocated to the program being insufficient, swapping-out page data stored in the first area to a second area of the memory,
   wherein the swapping out comprises identifying an attribute of the page data based on whether the page data stored in the first area of the memory is to be discarded or loss compressed, adding the attribute to the page data, compressing the page data to be swapped out using a specific compression algorithm, and swapping out the compressed page data partially or entirely based on the attribute of the page data,
   wherein the specific compression algorithm is selected from a loss compression algorithm or a lossless compression algorithm based on the attribute of the page data, and
   wherein the method further comprises:
   storing metadata with respect to the used specific compression algorithm in the second area;
   based on the compressed data that is stored in the second area being swapped in to the first area, decompressing the compressed data based on the metadata;
   identifying whether the decompressed data is restorable;
   restoring the decompressed page data when the decompressed page data is restorable; and
   swapping in the decompressed page data to the first area of the memory.

9. The method as claimed in claim 8, wherein the swapping out comprises identifying the attribute of the page data based on an address in the first area in which the page data is stored.

10. The method as claimed in claim 8, wherein the swapping out comprises, based on a part of the page data being restorable, identifying the attribute of the page data as a first attribute, and based on the page data not including restorable data, identifying the attribute of the page data as a second attribute; and
    based on the attribute of the page data being the first attribute, swapping out a part of data that remains after restorable data is discarded from the page data, and based on the attribute of the page data being the second attribute, swapping out the page data entirely.

11. The method as claimed in claim 10, further comprising:
    based on the partially swapped out data being swapped in from the second area to the first area, restoring data discarded when the part of data is swapped out.

12. The method as claimed in claim 8, wherein the swapping out comprises identifying the attribute of the page data based on pre-generated attribute information with respect to the page data.

13. The method as claimed in claim 12, further comprising:
    adding the attribute information to the page data and storing in the first area.

14. The method as claimed in claim 8, wherein the swapping output comprises:
    based on the page data to be swapped out being at least one of image data and video data, identifying the attribute of the page data to be swapped out as a first attribute, and
    based on the attribute of the page data to be swapped out not being the first attribute, identifying the attribute of the page data to be swapped out as a second attribute; and
    based on the attribute of the page data to be swapped out being the first attribute, compressing the page data to be swapped out using the loss compression algorithm, and
    based on the attribute of the page data to be swapped out being the second attribute, compressing the page data to be swapped out using the lossless compression algorithm.

15. A non-transitory computer readable recording medium that stores a program which, when executed by a processor of an electronic apparatus, causes the electronic apparatus to perform operations comprising
    receiving a request for executing a program; and
    based on an available capacity of a first area of a memory of the electronic apparatus to be allocated to the program being insufficient, swapping-out page data stored in the first area to a second area of the memory,
    wherein the swapping-out comprises identifying an attribute of the page data based on whether the page data stored in the first area of the memory is to be discarded or loss compressed, adding the attribute to the page data, compressing the page data to be swapped out using a specific compression algorithm, and swapping out the compressed page data partially or entirely based on the attribute of the page data,
    wherein the specific compression algorithm is selected from a loss compression algorithm or a lossless compression algorithm based on the attribute of the page data, and
    wherein the controlling method further comprises:
    storing metadata with respect to the used specific compression algorithm in the second area;
    based on the compressed data that is stored in the second area being swapped-in to the first area, decompressing the compressed data based on the metadata;
    identifying whether the decompressed data is restorable;
    restoring the decompressed page data whether the decompressed page data is restorable; and
    swapping in the decompressed page data to the first area of the memory.

* * * * *